(12) United States Patent
Johnson et al.

(10) Patent No.: US 8,135,735 B2
(45) Date of Patent: *Mar. 13, 2012

(54) COMPUTERIZED SYSTEM AND METHOD FOR TRACKING THE GEOGRAPHIC RELEVANCE OF WEBSITE LISTINGS AND PROVIDING GRAPHICS AND DATA REGARDING THE SAME

(75) Inventors: Jeremiah L. Johnson, Jacksonville, FL (US); Gregory A. Pool, Lewisville, NC (US); Edward Tisdale, Pensacola, FL (US); Brian McArthur, Cornelius, NC (US); Chris Holmes, China Grove, NC (US)

(73) Assignee: Geodex, LLC, Winston-Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/117,480

(22) Filed: May 27, 2011

(65) Prior Publication Data

US 2011/0218961 A1    Sep. 8, 2011

Related U.S. Application Data

(63) Continuation-in-part of application No. 12/501,122, filed on Jul. 10, 2009.

(51) Int. Cl.
*G06F 17/00* (2006.01)
*G06F 15/16* (2006.01)

(52) U.S. Cl. ........................ 707/769; 709/218
(58) Field of Classification Search ............... None
See application file for complete search history.

(56) References Cited

U.S. PATENT DOCUMENTS 5,898,780 A    4/1999    Liu et al.
(Continued)

FOREIGN PATENT DOCUMENTS

WO    2006082489    8/2006
(Continued)

OTHER PUBLICATIONS

An article entitled "Building a Geographical Ontology for Intelligent Spatial Search on the Web" by Fu et al., 2005, Retrieved from the Internet: <http://citeseerx.ist.psu.edu/viewdoc/summary?doi=10.1.1.61.1033>.

(Continued)

*Primary Examiner* — Tarek Chbouki
(74) *Attorney, Agent, or Firm* — Amster, Rothstein & Ebenstein LLP

(57) ABSTRACT

A computer-implemented method includes the steps of accessing, using one or more processors, data relating to visitors who have visited one or more websites, determining, using one or more processors, geographic areas corresponding to locations of the visitors, receiving, using one or more processors, one or more signals indicating a first request to provide at least a portion of data to be provided on a webpage, determining, using one or more processors, a geographic area from where the request originates; generating, using one or more processors, a subset of the data that pertains to the requested data based on: relevancy of the requested data to the geographic area from where the request originates, and relevancy of the requested data to the visitors that are located in or near the geographic area from where the request originates; and providing, using one or more processors, the subset of the data; and providing, using one or more processors, data that indicates whether or not the visitors found each item in the subset to be relevant to one or more geographic regions related to the geographic area from where the request originates.

20 Claims, 13 Drawing Sheets

U.S. PATENT DOCUMENTS

| | | | |
|---|---|---|---|
| 6,859,791 | B1 | 2/2005 | Spagna et al. |
| 6,871,076 | B2 | 3/2005 | Samn |
| 7,231,405 | B2 | 6/2007 | Xia |
| 7,451,130 | B2 | 11/2008 | Gupta et al. |
| 7,483,984 | B1 | 1/2009 | Jonker et al. |
| 7,539,644 | B2 | 5/2009 | Hu et al. |
| 7,565,157 | B1 | 7/2009 | Ortega et al. |
| 7,606,875 | B2 | 10/2009 | Xie et al. |
| 7,660,784 | B1 | 2/2010 | Virdy et al. |
| 7,685,191 | B1 | 3/2010 | Zwicky et al. |
| 7,844,590 | B1 | 11/2010 | Zwicky et al. |
| 7,886,047 | B1 | 2/2011 | Potluri |
| 2003/0078035 | A1 | 4/2003 | Sheha et al. |
| 2004/0110515 | A1 | 6/2004 | Blumberg et al. |
| 2006/0047829 | A1 | 3/2006 | Acharya et al. |
| 2006/0047835 | A1 | 3/2006 | Greaux |
| 2006/0123014 | A1 | 6/2006 | Ng |
| 2006/0282660 | A1 | 12/2006 | Varghese et al. |
| 2007/0011150 | A1 | 1/2007 | Frank |
| 2007/0060117 | A1 | 3/2007 | Fishman et al. |
| 2007/0061245 | A1 | 3/2007 | Ramer et al. |
| 2007/0233671 | A1 | 10/2007 | Oztekin et al. |
| 2007/0239680 | A1 | 10/2007 | Oztekin et al. |
| 2008/0233927 | A1 | 9/2008 | Moon et al. |
| 2009/0089254 | A1 | 4/2009 | Von Kaenel et al. |
| 2009/0132646 | A1 | 5/2009 | Yang et al. |
| 2010/0131501 | A1 | 5/2010 | Deeming et al. |
| 2010/0268720 | A1 | 10/2010 | Spivack et al. |
| 2010/0281011 | A1 | 11/2010 | Santi et al. |
| 2010/0318535 | A1 | 12/2010 | Weber et al. |
| 2011/0004524 | A1* | 1/2011 | Paul et al. .................. 705/14.58 |
| 2011/0035458 | A1* | 2/2011 | Burnim ........................ 709/206 |

FOREIGN PATENT DOCUMENTS

WO    2006118968 A2    11/2006

OTHER PUBLICATIONS

An article entitled "Exploiting Geographical Location Information of Web Pages", by Buyukkokten et al., 1999, Retrieved from the Internet: <http://citeseerx.ist.psu.edu/viewdoc/summary?doi=10.1.1.21.3119>.

An article entitled "Categorizing Web Queries According to Geographical Locality" by Gravano et al., 2003, Retrieved from the Internet: <http://wing.comp.nus.edu.sg/downloads/keyphraseCorpus/112/112.pdf>. Citation available at: <http://portal.acm.org/citation.cfm?id=956925>.

An article entitled "Computing Geographical Scopes of Web Resources" by Ding et al., 2000, Retrieved from the Internet: <http://www.cs.columbia.edu/techreports/cucs-001-00.pdf>. Citation available at: <http://portaLacm.org/citation.cfm?id=672013>.

An article entitled "Spatio-Textual Indexing for Geographical Search on the Web" by Vaid et al., 2005, Retrieved from the Internet: <http://citeseerx.ist.psu.edu/viewdoc/summary?doi=10.1.1.65.4813>.

An article entitled "Geospatial Mapping and Navigation of the Web" by McCurley, 2001, Retrieved from the Internet: <http://mccurley.org/papers/geo.pdf>. Citation available at: <http://portal.acm.org/citation.cfm?id=372056>.

Bavaro, Jackie, Official Google Blog: "Refine Your Searches by Location" http://googleblog.blogspot.com/2010/02/refine-your-searches-by-location.html, Feb 26, 2010.

Rao, Leena, Google Enhances Local Search with "Nearby" Filter, http://techcrunch.com/2010/02/26/google-enhances-local-search-with-nearby-filter/, Feb. 26, 2010.

* cited by examiner

COMPUTERIZED SYSTEM AND METHOD FOR TRACKING THE GEOGRAPHIC RELEVANCE OF WEBSITE LISTINGS AND PROVIDING GRAPHICS AND DATA REGARDING THE SAME

RELATED APPLICATIONS

This application is a continuation of U.S. patent Ser. No. 12/501,122, filed Jul. 10, 2009, the contents of which are incorporated herein by reference in their entirety.

FIELD OF THE INVENTION

The present invention generally relates to a computerized system and method for tracking and displaying data identifying the geographic relevance of website listings on Internet search engines, parked web pages, Internet service provider ("ISP") redirect web pages, and other similar web listing services without requiring extra input from Internet users.

BACKGROUND OF THE INVENTION

The Internet is organized in large part by keywords. In this regard, keywords are stored on a website to indicate to an Internet search engine the information and content that is contained on a particular page on that website. For example, if a website relates to car ports, then the website owner will utilize keywords that relate to the car port industry. Such keywords may include, for example, "car ports", "metal car ports", "buildings", "RV covers", and "boat covers". Thus, if an Internet user searches for metal car ports, then the car port website would be included in the search results.

By providing website owners with control over the selection of metadata (e.g., keywords) for their websites, such website owners have the ability to make their websites appear high in the search results returned by a search engine. In this regard, website owners who select keywords frequently used by Internet users in performing searches for a particular subject will appear higher in search result listings than website owners who select less used keywords for the same subject. Thus, businesses that dedicate their resources (e.g., time and money) to the selection of keywords typically appear higher in Internet search results than businesses that do not.

Moreover, some websites will appear high on a listing of Internet search results even though those website are not particularly relevant to what is being searched for by the Internet user. This is because some businesses utilize keywords that do not even relate to the content that is provided on their website. This method often misleads Internet users into visiting websites that they were not even searching for. Thus, Internet search results that stem from this method are oftentimes irrelevant and not useful to Internet users.

In order to prevent website owners from having too much control over Internet search results, major search engines have used a variety of techniques to control search results. For example, search engines may track the number of visitors on particular website, the website's keywords, the number of websites that link to that page, the words and the paragraphs on the page, and whether such words or paragraphs are relevant to the search terms entered by the user. By using these parameters, search engines have been, to a certain degree, able to limit the ability of website owners to control the results of a particular search.

Additionally, some search engines allow Internet users to "tag" websites that they deem relevant to their search terms. For example, if an Internet user searches for a car port and the search returns a website with the keywords "car port", then an Internet user can tag that particular website as being relevant to his or her search. This data can then be used to return more relevant search results in response to other similar searches. However, this approach requires the Internet user to actually tag relevant results, which many user's simply do not do.

Other technology used by search engines include natural language searching and semantic searching. This technology allows search engines to understand the natural language and semantic structure of a search to determine the meaning of search words. For example, the word "bark" may mean "bark from a tree" or "did you hear that dog bark?" When search engines are able to understand the natural language of a search, they return better and more relevant search results.

Moreover, the Internet is not necessarily organized according to the geographic location where websites are based. For example, a website may be based in North Carolina, but may provide goods or services for people who live in Arizona. This makes it very difficult for the Internet to be organized by geographic regions because there is no real way to determine a particular geographic location to which a website is relevant. Some companies, including local.com and Google, have tried to organize their search results according to the end user's geographic location. In this regard, these companies try to narrow Internet search results by geographic region by requiring the Internet user to provide additional information (e.g., their zip code or city name) with a search inquiry. However, many Internet users will not undertake these extra steps.

Thus, there is a long felt need for a system and method that better organizes information available on the Internet in such a way that search engines can use reasoning to intelligently provide geographically relevant search results with no (or very little) input from Internet users.

SUMMARY OF THE INVENTION

A computer-implemented method according to an exemplary embodiment of the present invention comprises: accessing, using one or more processors, data relating to visitors who have visited one or more websites; determining, using one or more processors, geographic areas corresponding to locations of the visitors; receiving, using one or more processors, one or more signals indicating a first request to provide at least a portion of data to be provided on a webpage; determining, using one or more processors, a geographic area from where the request originates; generating, using one or more processors, a subset of the data that pertains to the requested data based on: relevancy of the requested data to the geographic area from where the request originates, and relevancy of the requested data to the visitors that are located in or near the geographic area from where the request originates; and providing, using one or more processors, the subset of the data; and providing, using one or more processors, data that indicates whether or not the visitors found each item in the subset to be relevant to one or more geographic regions related to the geographic area from where the request originates.

According to at least one embodiment, the data provided that indicates whether or not the visitors found each item in the subset to be relevant further comprises an indication of whether or not the visitors found each item in the subset to be relevant to a plurality of geographic regions.

According to at least one embodiment, the method further comprises a step of providing, using one or more processors, an interface for reorganizing the subset according to each of the plurality of geographic regions.

According to at least one embodiment, the interface comprises a bar indicating, by use of one or more colors, the relevance of each set in the subset of data to the respective geographic regions.

According to at least one embodiment, the one or more geographic regions comprise at least one of: a geographic region local to the geographic area from where the request originates; a geographic region within a state of the geographic area from where the request originates; a geographic region within a region of the geographic area from where the request originates; a geographic region within a nation of the geographic area from where the request originates; a geographic region within a city of the geographic area from where the request originates; a geographic region within a specified distance from the geographic area from where the request originates; or a geographic region near the geographic area from where the request originates.

A computer-implemented method according to an exemplary embodiment of the present invention comprises: accessing, using one or more processors, data relating to visitors who have visited one or more websites; determining, using one or more processors, the geographic areas corresponding to locations of the visitors; receiving, using one or more processors, one or more signals indicating a first request to provide at least a portion of data to be provided on a webpage; determining, using one or more processors, a geographic area from where the request originates; generating, using one or more processors, a subset of the data that pertains to the requested data based on: relevancy of the requested data to the geographic area from where the request originates, and relevancy of the requested data to the visitors that are located in or near the geographic area; and providing, using one or more processors, the subset of the data, wherein: the subset is organized with each item of data associated with one of a plurality of geographic regions related to the geographic area from where the request originates, items of data in the subset that are most relevant to the geographic area from where the request originates are associated with a first geographic region; and items of data in the subset that are less relevant to the geographic area from where the request originates are associated with a second geographic region.

According to at least one embodiment, the method further comprises a step of providing, using one or more processors, an interface for reorganizing the subset of data according to each of the plurality of geographic regions.

According to at least one embodiment, the interface comprises a bar indicating, by use of one or more colors, the relevance of each set in the subset of data to the respective geographic regions.

According to at least one embodiment, the method further comprises steps of: receiving, using one or more processors, one or more signals indicating a second request to provide at least a second portion of the data, wherein the second request originates from a second geographic area location different from the geographic area from where the first request originates; determining, using one or more processors, the location of the second geographic area from where the second request originates; and generating, using one or more processors, a second subset of the data responsive to the second request based on: relevancy of the requested data to the second geographic area, and relevancy of the requested data to the visitors in or near the second geographic area.

According to at least one embodiment, the plurality of geographic regions comprises at least one of: a geographic region local to the geographic area from where the request originates; a geographic region within a state of the geographic area from where the request originates; a geographic region within a region of the geographic area from where the request originates; a geographic region within a nation of the geographic area from where the request originates; a geographic region within a city of the geographic area from where the request originates; a geographic region within a specified distance from the geographic area from where the request originates; or a geographic region near the geographic area from where the request originates.

According to at least one embodiment, the at least a portion of the subset of data comprises at least one of the following: images; text; hyperlinks; graphical data; videos; charts; forms; boxes containing a number representing a number of times visitors have visited each of the one or more websites; graphics containing a number representing a number of times visitors have visited each of the one or more websites; graphics containing text relating to a number of times visitors have visited each of the one or more websites; or geographic data pertaining to the visitors.

According to at least one embodiment, the at least a portion of the subset of data comprises at least one of the following: a bar indicating the relevance of a website of the one or more websites to the geographic area from where the request originates; a bar indicating, by the use of one or more colors, the relevance of each of the one or more websites to the geographic area from where the request originates; a bar indicating, by the use of text, the relevance of each of the one or more websites to the geographic area from where the request originates; a map indicating geographic information pertaining to the visitors; or a map automatically indicating, via colored markers, a unit of distance between at least one of relevant geographic information pertaining to the visitors and the geographic area from where the request originates.

A computer-implemented method according to an exemplary embodiment of the present invention comprises: receiving, using one or more processors, one or more signals indicating a first request to provide at least a portion of data to be provided on a webpage; determining, using one or more processors, the geographic area from where the request originates; generating, using one or more processors, a subset of the data from the database that pertains to the data requested based on: relevancy of the requested data to the geographic area from where the request originates, wherein the subset of data further comprises information that pertains to at least one other geographic region related to the geographic area from where the request originates; and providing, using one or more processors, an interface for reorganizing the order of the subset of data based on the at least one other geographic region and the geographic area from where the request originates.

According to at least one embodiment, the interface for reorganizing the order of the subset of the data reorganizes the order in response to a command.

According to at least one embodiment, the at least one other geographic region comprises at least one of: a geographic region local to a city in the geographic area from where the request originates; a geographic region within a state of the geographic area from where the request originates; or a geographic region within a region of the geographic area from where the request originates.

According to at least one embodiment, the order of the subset changes when the at least one other geographic region changes.

According to at least one embodiment, the interface comprises at least one of the following: a map; text; images; hyperlinks; graphical data; videos; charts; or forms.

According to at least one embodiment, the method further comprises updating the map to reflect another selected geographic region upon selection of another geographic region.

According to at least one embodiment, the method further comprises manually inputting a geographic region different from the geographic area from where the request originates.

According to at least one embodiment, the interface for reorganizing the order of the subset of the data reorganizes the order in response to the manual input of the geographic region different form the geographic area from where the request originates.

BRIEF DESCRIPTION OF THE DRAWINGS

The features and advantages of the present invention will be more fully understood by reference to the following, detailed description of the preferred, albeit illustrative, embodiment(s) of the present invention when taken in conjunction with the accompanying figures, wherein.

DETAILED DESCRIPTION OF THE PREFERRED EMBODIMENT(S)

The present invention generally relates to a computerized system and method for tracking and displaying data identifying the geographic relevance of website listings on Internet search engines, parked web pages, ISP redirect web pages, and other similar web listing services without requiring extra input from Internet users.

More particularly, Internet users often navigate to websites through the use of links provided on search engines (e.g., in response to a keyword search), parked web pages, ISP redirect web pages, and other web listing services. Each time an Internet user clicks on a website link provided on one of these web services, the software and method of the present invention tracks that person's educated decision in selecting the link, along with his or her geographic location. As discussed below, the software automatically collects and stores this information in a database (e.g., on a server) in a format that can be quickly accessed and used in the future when other Internet users perform the same keyword search or visit the parked/redirect page again. Based on this stored information, the software automatically sends signals to the Internet user's computer that causes his or her web browser to display data and graphics that indicate whether the websites listed on the web page (e.g., search results on a search engine or links on a parked/redirect page) has, in the past, been frequently visited and found to be popular by other Internet users in specific geographic areas. As a result, the software and method of the present invention enables search engines, parked/redirect web pages, and other similar web services to be automatically organized by popularity within a geographic region. Moreover, each time data is collected by this software (e.g., when a user selects a link), the search engine and parked page will grow naturally and intelligently, thereby becoming more and more useful to the Internet user. The various aspects of the software and method of the present invention are now described.

Figure 1:
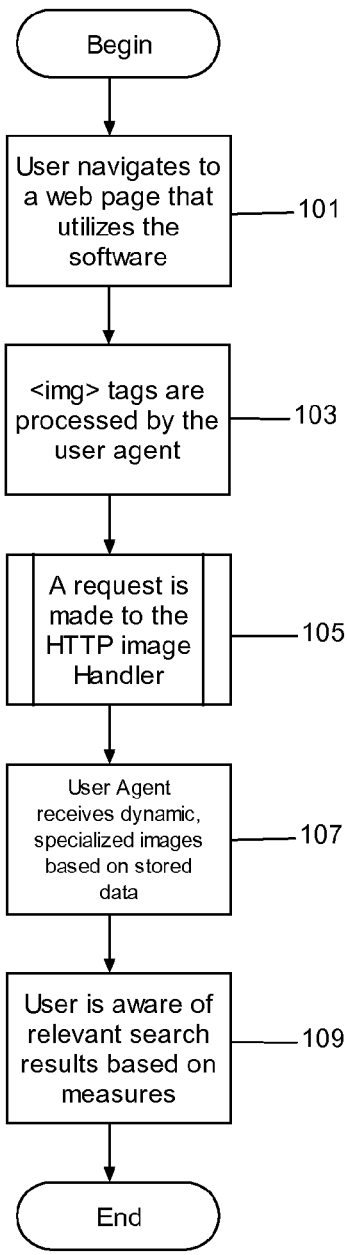
FIG. 1 is a flow chart which shows an embodiment of the general process performed by the software of the present invention.

In one embodiment (see FIG. 1), an Internet user navigates to a web page (e.g., search engine, parked page, or ISP redirect page) that utilizes the software and method of the present invention, Step 101. Image tags are processed by the user agent (e.g., the Internet user's web browser), Step 103. In this regard, the user's web browser loads the initial HTML document for the web page, and then dynamically generates and displays images 13, 15, 17 and 19, as discussed below (see FIGS. 2 and 3). The software preferably sets these images to expire immediately (e.g., after they are displayed) so the user's web browser does not cache them and show stale data on subsequent searches.

In one embodiment, the software of the present invention is stored on a server, which may be the same as or separate from the server on which the website utilizing the software operates. The Internet user makes a request on the web page, which causes his or her computer to send signals to the server that cause the software to request information from the HTTP Image Handler, Step 105. The user request may be made in the form a keyword search on a search engine, an incorrect web address that leads the user to an ISP redirect web page, or by the user simply visiting a parked web page.

As discussed below, each time an Internet user clicks on a link on a website utilizing the software of the present invention, the software acquires and stores data (e.g., hit statistics) relating to the link that was clicked by the user, the geographic location of the user who clicked on the link, and where a search engine is used, the keyword search entered by the user. As discussed herein, the HTTP Image Handler of the software processes the request from the user and references the relevant hit statistics that were previously stored. The software then transmits signals to the user's computer that cause graphic and data images to be displayed with one or more listings on the web page (e.g., search engine, parked/redirect pages). As discussed below with respect to FIGS. 2 and 3, the data and images indicate the number of other Internet users within a specific geographic radius that found each of such listings to be relevant or irrelevant and whether such listings were popular among such users in the specified geographic areas.

The User Agent (e.g., the Internet user's web browser) receives the signals transmitted from the Image Handler, which in turn, causes dynamic specialized images that include this data to be displayed with the listings on the website, Step 107. As a result, the user is made aware of relevant search results based on the measures (e.g., hits by geographic area) discussed above, Step 109.

The Search Engine Example

Figure 2:
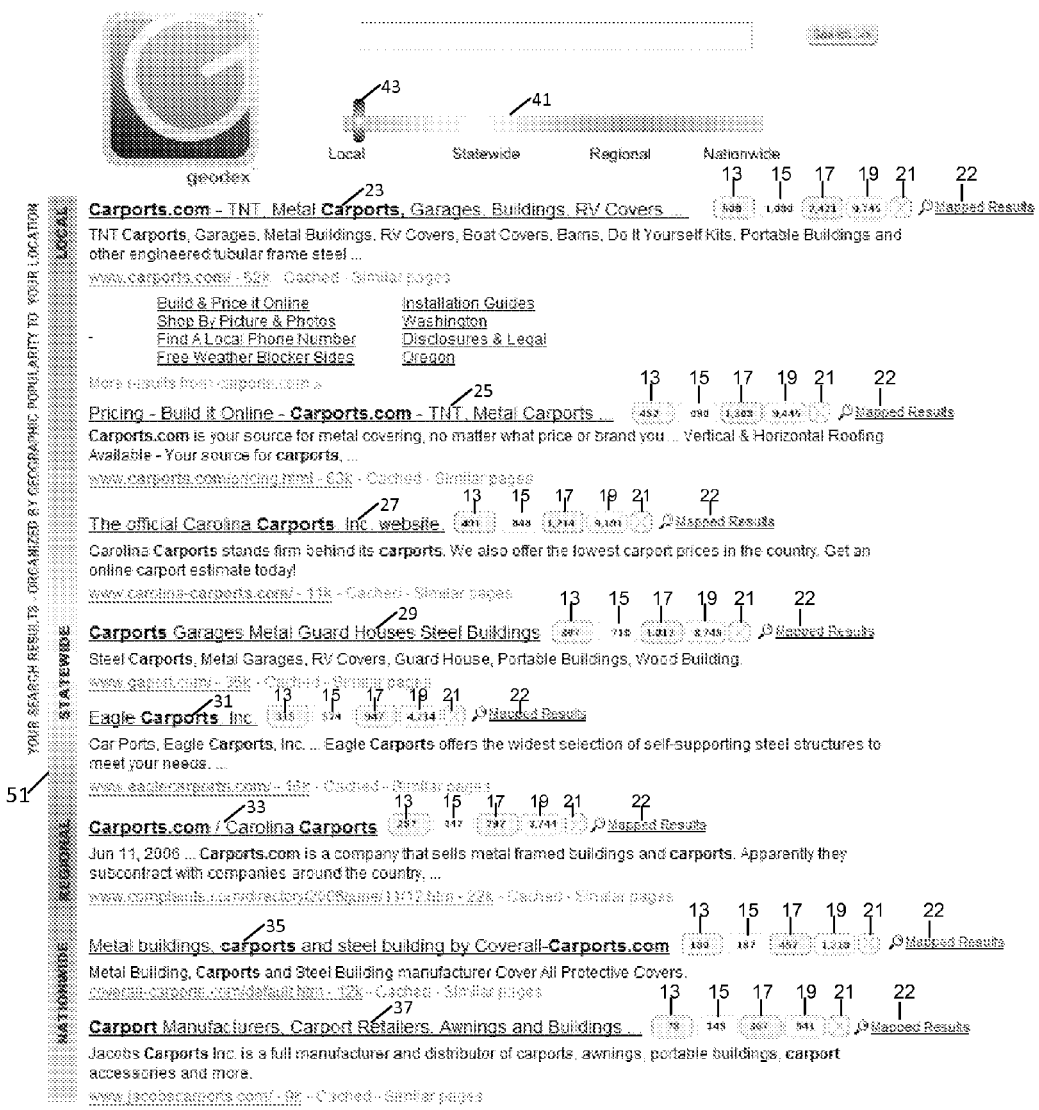
FIG. 2 shows an example of the results of a keyword search performed on a search engine that includes graphics and data generated by the software of the present invention.

One example of the dynamic specialized images received by the user's web browser in Step 107 is now described. Referring to FIG. 2, in response to receiving a specific keyword search (here, "car ports") on a search engine, a graphical user interface 11 is displayed on the user's web browser. In one embodiment, the graphical user interface 11 includes website listings 23, 25, 27, 29, 31, 33, 35, and 37 that are responsive to the keyword search. Additionally, four boxes 13, 15, 17, and 19 are provided next to each of the listings to respectively indicate a first geographic area relative to the user, a second geographic area relative to the user, a third geographic area relative to the user, and a fourth geographic area relative to the user. Each of these boxes also includes data specifying the number of other Internet users in the specific geographic areas that have previously clicked on the particular listing when they used the same (or similar) search terms.

In the example shown in FIG. 2, the boxes 13, 15, 17, and 19 are provided to the right of the first listing 23, "Carports.com—TNT, Metal Carports, Garages, Buildings, RV Covers . . . " The first box 13 specifies the number (e.g., 500) of other people in the user's local area (e.g., city) that have searched for the same (or similar) keywords and then clicked on that listing. The second box 15 specifies the number of people (e.g., 1,000) in the user's state that have searched for the same (or similar) keywords and then clicked on listing 23. The third box 17 specifies the number of people (e.g., 2,421) in the user's region (the northeast region of the U.S.) that have searched for the same (or similar) keywords and then clicked on listing 23. The fourth box 19 specifies the number of people (e.g., 9,745) nationwide that have searched for the same (or similar) keywords as the user and then clicked on listing 23. The fifth box 21, which is optional, includes an "X" which functions as button that can be clicked by a user to indicate to the search engine that the particular listing (here, listing 23) is completely unrelated to his or her search, and thus, is not useful.

Boxes (not numbered) and data are provided in the same manner with respect to each of the remaining search listings 25, 27, 29, 31, 33, 35, and 37 in FIG. 2. In this embodiment, the first search result listing 23 is not only relevant to the keyword search (e.g., "car ports"), the tagging (if any) and the number of links to the website, but also represents the most visited website by other Internet users who reside in the same local area (e.g., city) as the user and who have made the same keywords search. The results that reside further down the search results page represent listings that that were visited by other Internet searchers from geographic regions that are located further away from the user.

With this information, the Internet user who performed the search is able to better determine which search result listings are most likely to be geographically appropriate (e.g., on a local, statewide, regional, or national basis) for what he or she is searching for, and whether that listing was popular among other Internet user's for a given geographic region. For example, in FIG. 2, the user would understand from the boxes and data that listing 23 is more relevant to their local area (e.g., city) than listing 37 because five-hundred (500) other people in the user's local area have clicked link 23 whereas only seventy-eight (78) other people in the same local area have clicked link 37. As a result, Internet users can make an educated decision in selecting which websites are the most relevant and popular with respect to their geographic area. At the same time, as additional information is gathered from searches by Internet users who make subsequent searches, the search engine will become more intelligent since it will be able to return even more data regarding the geographic relevance and popularity of listings provided with search results.

It should be noted that the present invention is not limited to the use of the local, statewide, regional, and nationwide designations discussed above. In this regard, some customers may wish to designate the geographic locations of other users who have clicked on a link according to a radius band or some other measure of distance. Thus, the software may be implemented with such other designations in place of the local, statewide, regional, and nationwide designations discussed above. For example, a customer may designate boxes 13, 15, 17, and 19 to correspond to specific distance ranges (e.g., a radius band) from which other users who have clicked on a website are located relative to the current user.

In one embodiment (now shown), box 13 indicates the number of other people who are located 1-50 miles away from the current user and have clicked on a particular website link. Similarly, box 15 indicates the number of other people who are located 51-100 miles away from the current user and have clicked on that website link. Additionally, box 17 indicates the number of other people who are located 101-400 miles away from the current user and have clicked on that website link. Likewise, box 19 indicates the number of other people who are located 401-3000 miles away from the current user and have clicked on that website link. These distance ranges preferably do not overlap with one another.

Since search listings are organized by their geographic popularity, some very small areas (e.g., rural areas) search engines may not return many (or any) local listings. Thus, in one embodiment (see FIG. 2), a slide bar 41 and slider 43 are provided with the search results to allow the user to reorganize the search listings by geographic area. In this regard, the Internet user may move the slider 43 across slide bar 41 to wind (e.g., re-sort) the search results based on a statewide, regional or national basis. For example, if the slider 43 were moved to the Statewide position on the slide bar 41, then the search results would be rearranged such that the listings that are most relevant in a particular state would be listed first, with the remaining websites that were more relevant on a local, regional, and nationwide basis listed thereafter. The order in which these remaining websites will be listed can be specified by the software developer or website owner.

Optionally, the slide bar 41 has a color gradient, with each color representing a different geographic area. For example, the color green represents local listings, the color yellow represents statewide listings, the color red represents regional listings, and the color purple represents national listings. Likewise, each of the boxes 13, 15, 17, and 19 could have colors that correspond to this coloring scheme. Thus, boxes 13, 15, 17, and 19 would be green, yellow, red and purple, respectively. In this way, there is a visual correlation between the colors on the slide bar and the colors for each box.

In one embodiment, there may also be a vertical color gradient scale 51 provided adjacent to the search results (here, at the left of the search results). This color gradient scale 51 also corresponds to the colors on the boxes 13, 15, 17, and 19 and the slide bar 41 and may be labeled with their corresponding geographic areas. Thus, in this embodiment, the color gradient scale 51 includes the color green and the label "LOCAL" to indicate listings that are most relevant to a local area, the color yellow and the label "STATEWIDE" indicate listings that are most relevant to a particular state, the color red and the label "REGIONAL" indicates listings that are most relevant to a particular region, and the color purple and the label "NATIONWIDE" indicate listings that are most relevant on a nationwide basis.

Thus, if listings 23, 25, and 27 received the most hits (e.g., clicks) from Internet users in the local area of the Internet user, then the portion of the color gradient scale 51 adjacent to these three listings would be different shades of green. The most relevant and popular of these listings (here, listing 23) will be the darkest shade of green, with the color gradient scale 51 becoming lighter shades of green for each listing within this group that is deemed to be less relevant (e.g., sites that have had less hits on a local basis, but nonetheless, received the most hits from users in the local area).

Similarly, if listing 29 received the most hits (e.g., clicks) from Internet users in the state of the Internet user, then the portion of the color gradient scale 51 adjacent to that listing would be yellow. Likewise, if listings 31 and 33 received the most hits (e.g., clicks) from Internet users in the state of the Internet user, then the portion of the color gradient scale 51 adjacent to these two listings would be red. If listing 37 received the most hits (e.g., clicks) from Internet users in the nation of the Internet user, then the portion of the color gradient scale 51 adjacent to this listing would be purple.

As noted above, the present invention is not limited to the user of the local, statewide, regional, and nationwide designations discussed above. Thus, the geographic labels on the color gradient scale can be changed according to the customer's preferences. For example, where the website is viewed by users in New York City, the "LOCAL" label on the color gradient scale 51 could be changed to read "NYC", the "STATEWIDE" label could be changed to read "NY STATE", the "REGIONAL" label can be changed to read "NEW ENGLAND AREA", and the "NATIONWIDE" label can be changed to read "UNITED STATES". In this way, it is possible to customize the display and presentation of data according to the geographic location of the Internet user.

Figure 3:
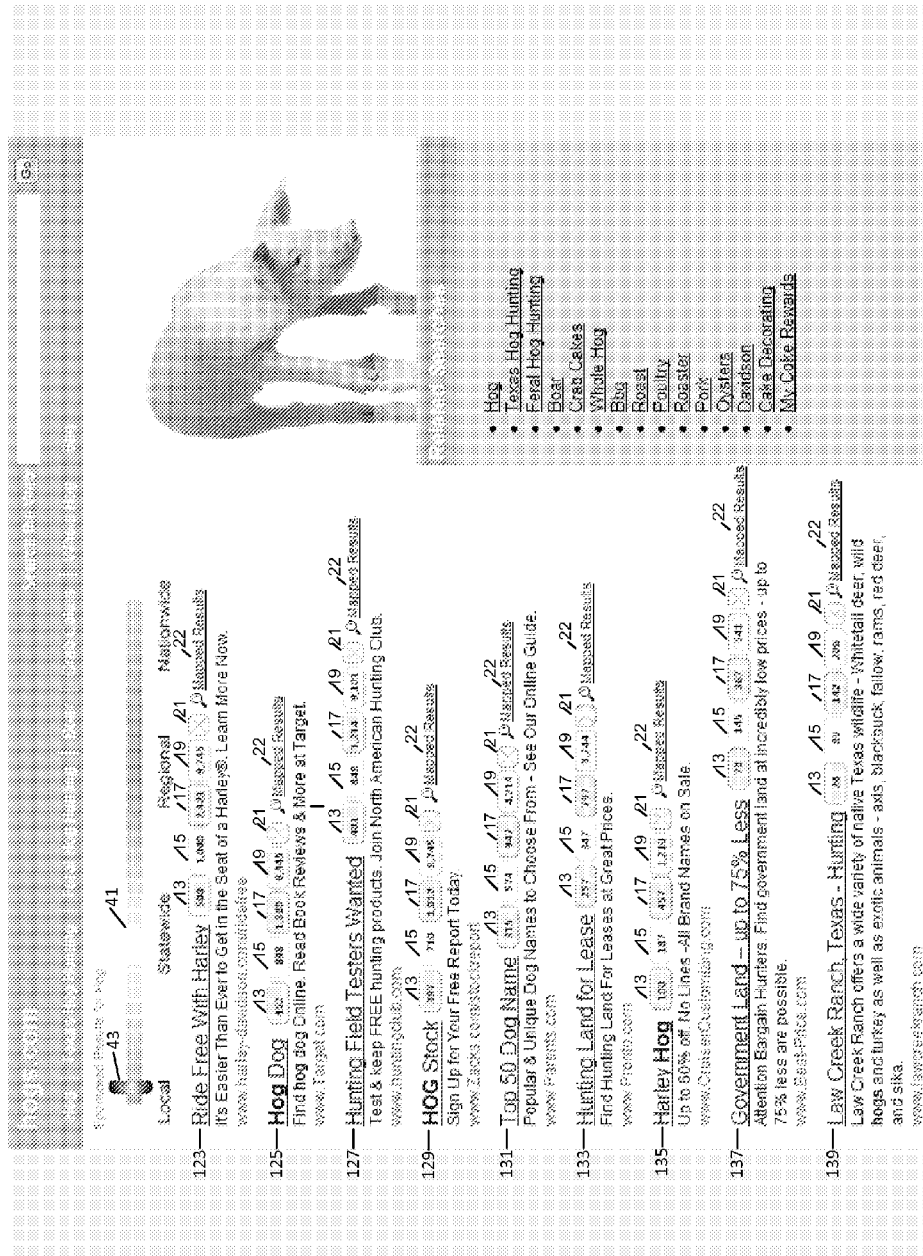
FIG. 3 shows an example of a parked web page that includes graphics and data generated by the software of the present invention.
Figure 11:
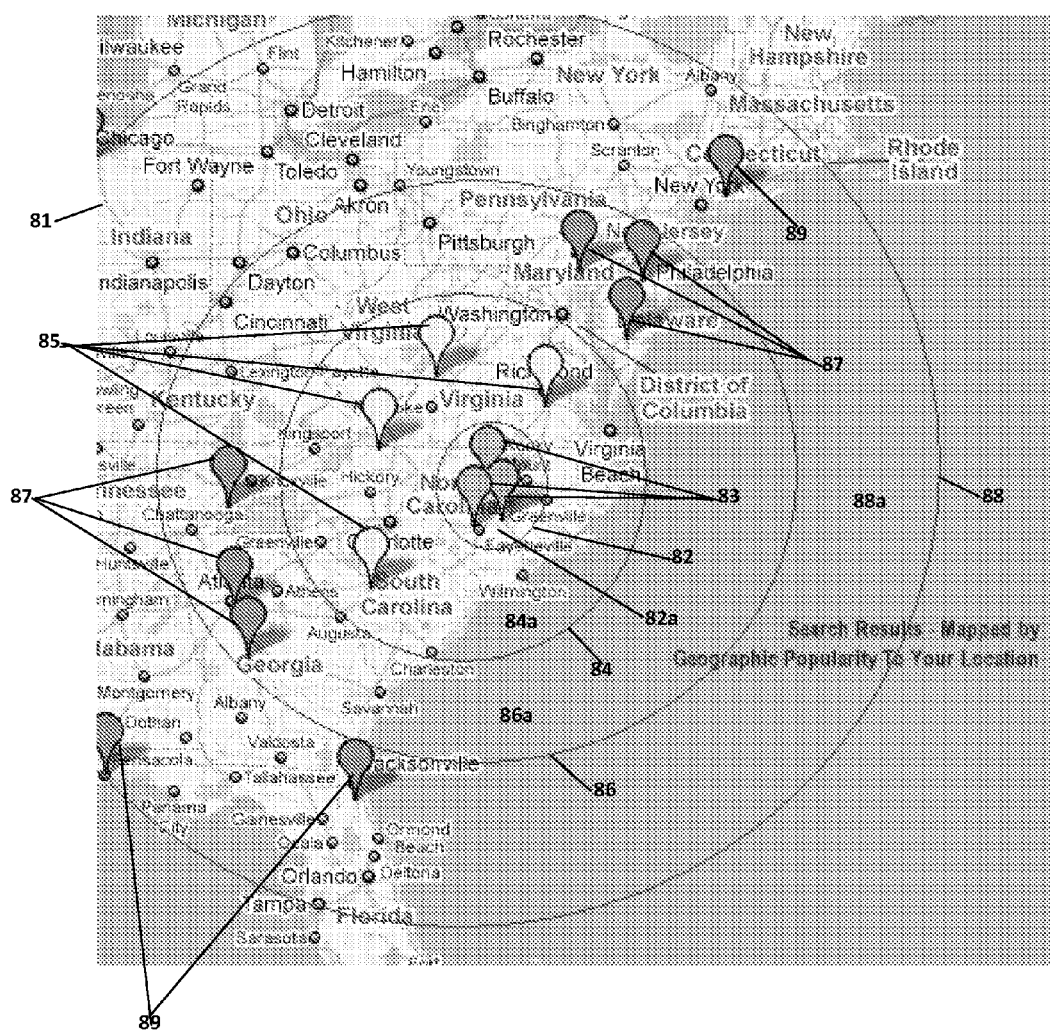
FIG. 11 is one embodiment of a map that may be displayed with the web pages of FIGS. 2 and 3.

Additionally, as shown in FIGS. 2 and 3, in one embodiment, a "Mapped Results" link 22 is provided next each link (here, to the right of each "X" box). As shown in FIG. 11, when the user clicks the Mapped Results link 22, the software will display a full-screen map 81 of the geographic locations of other users who have previously clicked on the website link that is associated with the Mapped Result link 22. In this regard, the map includes small pin-points 83, 85, 87, and 89 to respectively indicate the geographic location of other people who have clicked on the website link in the user's local, state, region, and nation.

For example, pinpoints 83 can be located within a first geographic area 82a defined by circle 82 in FIG. 11. Thus, pinpoints 83 will be provided for only those other Internet users who are located within area 82a and have previously clicked on the link that is associated with the particular map 81 being displayed. Similarly, pinpoints 85 can be located within a second geographic area 84a located between the circumferences of circles 82 and 84. Thus, pinpoints 85 will be provided for only those other Internet users who are located within area 84a and have previously clicked on the link that is associated with the particular map 81 being displayed. Likewise, pinpoints 87 can be located within a third geographic area 86a located between the circumferences of circles 84 and 86. Thus, pinpoints 87 will be provided for only those other Internet users who are located within area 86a and have previously clicked on the link that is associated with the particular map 81 being displayed. Pinpoints 89 can be located within a fourth geographic area 88a located between the circumferences of circles 86 and 88. Thus, pinpoints 89 will be provided for only those other Internet users who are located within area 88a and have previously clicked on the link that is associated with the particular map 81 being displayed.

It should be noted that circles 82, 84, 86, and 88 are optional. Additionally, areas 82a, 84a, 86a, and 88a may represent any geographic parameter that the software developer, webmaster, and customer utilizing the software chooses, including for example, area, town, village, city, state, region, country, province, measure of distance (e.g., a radius band measured by mileage, kilometers, etc.), or any other measure relative to the location of the user. For example, area 82a can represent areas that are located within a radius band of 0-30 miles from the user. Area 84a can represent areas that are located within a radius band of 31-X miles from the user, and so forth, and so on. Additionally, the pin-points 83, 85, 87, and 89 may also be color coded to correspond to the colors assigned to geographic regions in the boxes 13, 15, 17, and 19, as well as on the slide bar 41 and color gradient scale 51. For example, just like boxes 13, pin-points 83 could be green to indicate the location of other people who have clicked on the website in areas that correspond to the color green. Similarly, just like boxes 15, pin-points 85 could be yellow to indicate the location of other people who have clicked on the website in the areas that correspond to the color yellow. Further, like boxes 17, pin-points 87 could be red to indicate the location of other people who have clicked on the website in the areas that correspond to the color red. Additionally, like boxes 19, pin-points 89 could be purple to indicate the location of other people who have clicked on the website in the areas that correspond to the color purple. It should be noted that each listing on the web page will have its own map 81 which will be dynamically updated each time an Internet user visits the web page associated with the map.

Additionally, a smaller version (e.g., 3 inches by 3 inches) of this map may be displayed when the user drags his or her mouse pointer over the Mapped Results link 22. The smaller version of this map will likewise disappear when the user drags the mouse pointer away from the Mapped Results link 22.

It should be understood that the present invention is not limited to the foregoing color schemes and options, and modifications may be made with respect to the color of the boxes 13, 15, 17, 19, slide bar 41, and color gradient scale 51. Moreover, the color gradient scale 51 can be reorganized in the manner described above as the website listings are rearranged by geographic area when the user toggles the slider 43 to different geographic areas on slide bar 41. Moreover, the order in which the boxes 13, 15, 17, and 19 appear next to each listing can be rearranged.

Additionally, for some keyword searches, there may be very little (or no) stored data on the present system. For example, the very first time a keyword search is performed, there will be no geographic data to retrieve and display for that search. In such a case, the search results would appear in the normal way that search results are provided on the search engine being used. However, as a keyword search is repeated by users, the data is stored in the manner discussed herein and will be provided with search results. Thus, with each search, the data stored in the database grows, thereby making the software and method of the present invention more intelligent and useful to the user.

The Parked Web Page Example

The software and method of the present invention can be used in many different industries to increase a company's number of website clicks and profit levels. In one embodiment, the system and method of the present invention could be implemented on monetized parked web pages (e.g., web pages that are not yet associated with any particular product or service). Parked page websites often list hyperlinks to other websites that may be relevant to what an Internet user is looking for. As each link on the parked page is clicked by an Internet user, the website owner will receive payment from the website to which it links or an intermediary for that website. Thus, by providing the software of the present invention in conjunction with the links on parked pages, it is possible to increase a website owner's revenues.

For example, as shown in FIG. 3, the parked page "hogs.com" may have links to websites that are of interest to Harley Davidson® riders. In accordance with the present invention, data and graphics regarding the geographic relevance and popularity of each listed link 123, 125, 127, 129, 131, 133, 137, and 139 are provided. In this embodiment, boxes 13, 15, 17, and 19 are provided with each search result to indicate the number of other local, statewide, regional, and nationwide Internet users who have visited a listed website from the parked page in the manner discussed above. Likewise, the slide bar 41, slider 43 and color gradient scale (not shown) can be provided with the listings on the parked page and function in the manner discussed above.

These graphics and data will indicate to users who visit the parked pages the number of other people (locally, statewide, regionally, and nationally) who have clicked on the links on the parked pages. For example, in FIG. 3, the user would understand from the boxes and data provided that listing 123 is more relevant to their local area (e.g., city) than listing 139. This is because five hundred other Internet users have clicked on listing 123 in the user's local area, whereas only twenty four other Internet users in the same local area have clicked on listing 139. As a result, visitors will be more likely to visit linked websites from the parked page that are geographically pertinent, and thus, increase revenue of the parked page owner.

Use of the Software with ISP Redirect Pages and Other Web Listing Services

Some Internet service providers, such as Earthlink and AOL, provide a service that displays a web page of listings that the user is believed to be searching for when the user mistakenly enters an incorrect website address. In another embodiment, the software is implemented on ISP redirect web pages in the manner described with respect to FIGS. 2 and 3. As a result, the user will be more likely to click on the advertisement(s) on ISP redirect web pages.

It should be understood that the software and method of the present invention could be implemented with a broad array of Internet website listing services, including search engines, parked page services that display pay per click listings or pay per click advertising, website directories and listings, invalid website request services, and other products and services that display information that enables the user to final websites.

Steps Performed by HTTP Image Handler

Figure 10:
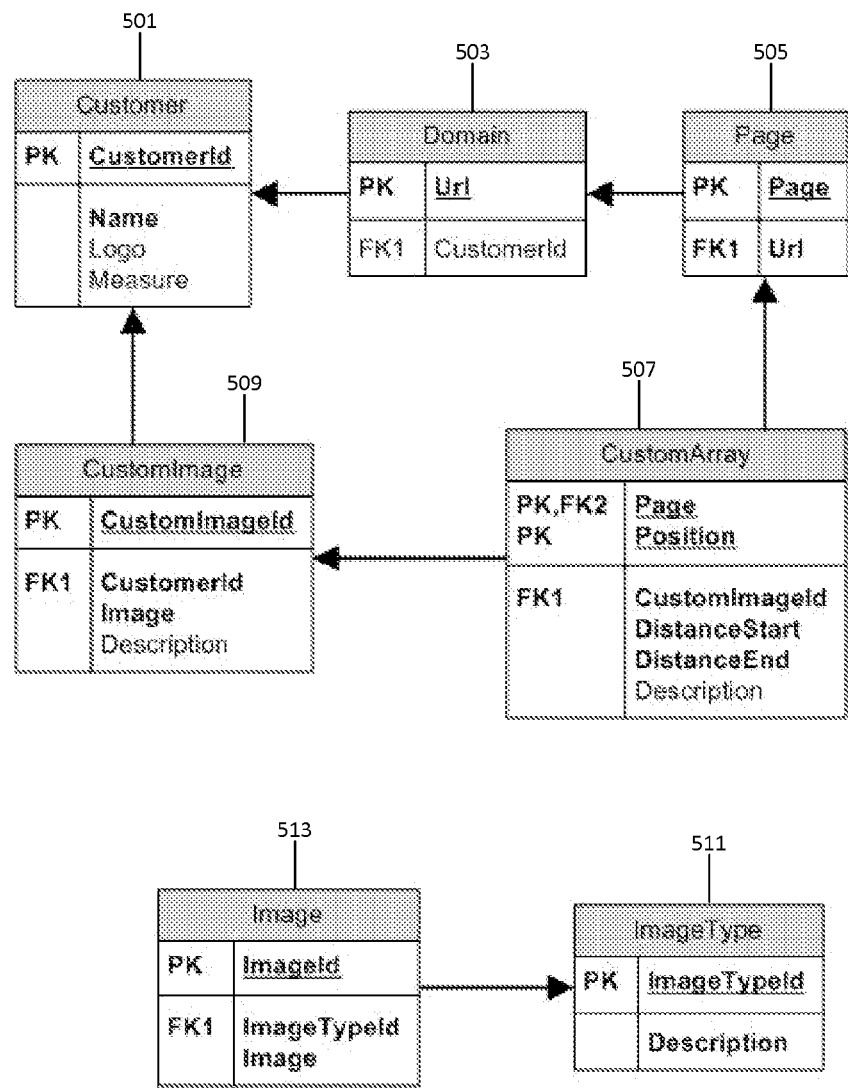
FIG. 10 is a diagram of an embodiment by which customer information is stored in a relational database.

One embodiment by which the HTTP Image Handler processes the request made in Step 105 (see FIG. 1) is now described with reference to FIG. 4. Specifically, a request (e.g., a keyword search) is received by the HTTP Image Handler, Step 201. The HTTP context of the request is instantiated, Step 203. To this end, memory is allocated to process the image request and application variables are populated, such as information regarding the current customer (see FIG. 10). At Step 205, the physical path of the application is instantiated. In this regard, memory is allocated to allow the application to find the base images referred to in Step 215 below. As discussed with reference to FIG. 2, images (e.g., colored boxes 13, 15, 17, and 19) and data (e.g., the number of website hits by geographic location) are provided to the Internet user to identify whether a particular website is relevant and popular in a certain geographic area. To do this, the software, either on the client-side (e.g., JavaScript) or server-side, assembles a query string that is used to retrieve these images and data from its database. The query string includes parameters that identify the location of the base images. An example of a URL containing a query string is, <img src="http://www.geodex.com/image.asmx?bi=6"/>. The parameter "bi=6" in this query string indicates that base image ("bi") (e.g., boxes 13, 15, 17, 19) having a position of 6 should be retrieved.

At Step 207, the software determines whether the parameters are present on the query string. If the parameters are not present, then a configuration error image is displayed to the Internet user at Step 209, and the process ends. On the other hand, if the parameters are present on the query string, the software parses these parameters to determine the location of the base images (e.g., colored boxes 13, 15, 17, and 19), Step 211.

Next, the software determines whether the base images are already present and stored in memory (e.g., RAM), Step 213. If not, the software obtains the base image (boxes) from a file system or a database server as defined by the location parameters in the query string, Step 215, and then loads the base images into memory (e.g., RAM), Step 217. It should be noted that in Steps 207-217, the software also retrieves, if used, base images from memory for the slide bar 41, slider 43, color gradient scale 53, and applies appropriate colors to each of these images.

After the base images have been loaded at Step 217, or if these images are determined to be present in memory at Step 213, the software retrieves data from the database regarding hit statistics based on the user's geographic location, Step 219. (This step is discussed in further detail with respect to FIG. 7). As discussed above, information is provided to the Internet user regarding the number of other Internet users who visited a website in a particular geographic area (e.g., local, statewide, regional, and nationwide). In this embodiment, the hit statistics that are retrieved in Step 219 include this information. Next, the retrieved hit statistics are applied as a statistical layer on top of the base images, Step 221. The software then sets the output stream to image content type at Step 223, and writes a new image (e.g., boxes 13, 15, 17, and 19 filled with hit statistics) in memory to the user agent (e.g., the user's web browser). As a result, the boxes and related data are displayed to the user in response to receiving a keyword search or in response to the user visiting a parked/redirect web page.

Steps Performed by HTTP Image Handler Where Custom Images are Used

A customer utilizing the software of the present invention may specify that custom images are to be displayed with the data and graphics provided by the software of the present invention. Where the customer specifies the use of such custom images, an embodiment by which the HTTP Image Handler processes the request made in Step 105 (see FIG. 1) is shown in FIG. 5. This process is similar to the process discussed with respect to FIG. 4, subject to the addition of the following steps relating to the generation of the custom image.

Specifically, a request (e.g., a keyword search) is received by the HTTP Image Handler, Step 701. The HTTP context is instantiated, Step 703. At Step 705, the physical path of the application is instantiated. As discussed above, images (e.g., colored boxes 13, 15, 17, and 19) and data (e.g., the number of website hits by geographic location) are provided to the Internet user. As a result, the software assembles a query string that is used to retrieve these images and data. The query string includes parameters that identify the location of the base images (e.g., boxes 13, 15, 17, 19). The identity of the referrer (e.g., website from which the request in Step 701 was received) is captured and matched to a customer (e.g., advertiser) stored in their relational database, Step 706.

At Step 707, the software determines whether there the parameters are present on the query string. If the parameters are not present, then the software transmits signals to the user's computer that cause a configuration error image to be displayed to the Internet user, Step 709. Additionally, the software transmits signals to a contact at the customer notifying the contact that the configuration is incorrect, Step 710, and the process ends. On the other hand, if the parameters are present on the query string, the software parses the parameters to determine the location of the base images (e.g., colored boxes 13, 15, 17, and 19) in the database, Step 711.

Next, the system determines whether the base images are already present and stored in memory (e.g., RAM), Step 713. If not, the system obtains the base images (e.g., boxes) from a file system or a database server as defined by location parameters in the query string, Step 715, and then loads the base image into memory, Step 717. It should be noted that in Steps 707-717, the software can also retrieve base images for the slide bar 41, slider 43, color gradient scale 53, and apply appropriate colors to each of these images.

After the base image has been loaded at Step 717, or if the base image is determined to be present in memory at Step 713, the software retrieves data regarding hit statistics based on the user's geographic location, Step 719. (This step is discussed in further detail with respect to FIG. 7). Next, the software establishes a font, typeface, background color, and size for the custom image based on customer defaults specified in the relational database (see FIG. 10), Step 720.

The retrieved hit statistics are then applied as a statistical layer on top of the base images, Step 721. The software then sets the output stream to image content type at Step 723, and writes the new image (e.g., boxes 13, 15, 17, and 19 filled with hit statistics) in memory to the user agent (e.g., the user's web browser). As a result, the boxes and related data are displayed to the user in response to receiving a keyword search or in response to the user visiting a parked web page.

Capturing Clicks by Users

Figure 6:
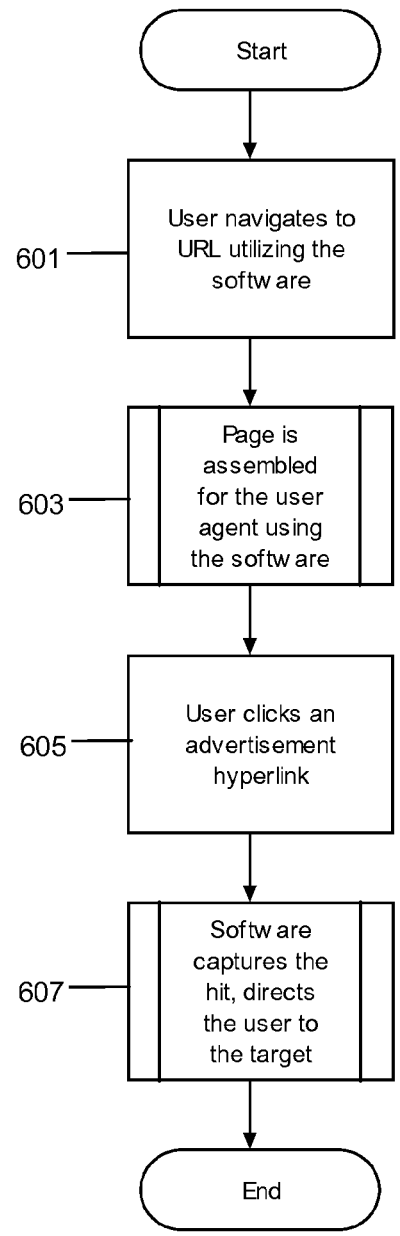
FIG. 6 is a flow chart that shows an embodiment of the method by which the software of the present invention captures clicks by users and tracks those clicks.

The method by which the software of the present invention captures clicks by users and tracks those clicks is described with respect to FIG. 6. Specifically, the user navigates to a URL that uses the software of the present invention, Step 601. A web page is assembled for the user agent (e.g., web browser) using the software, Step 603. In the case of a search engine, the user enters a keyword search and the results are displayed in accordance with the methods discussed above. In the case of the ISP redirect page, if a user enters an incorrect web address, a listing of potentially relevant links is provided on this page in the manner discussed above. In the case of the parked web page, a listing of website links is provided in the manner discussed above.

Next, the user clicks a link (e.g., advertisement) that was provided on the web page, Step 605. The software then captures the hit (e.g., click) by the user and directs the user to the target URL that they clicked, Step 607. As a result, the traffic of the site the user is directed to is increased, which, in turn, may increase sales or revenue from advertisements displayed on the site. For each such hit, the software acquires and stores data relating to the link that was selected by the user, the geographic location of the user who clicked on the link, and where a search engine is used, the keyword search entered by the user.

Figure 12:
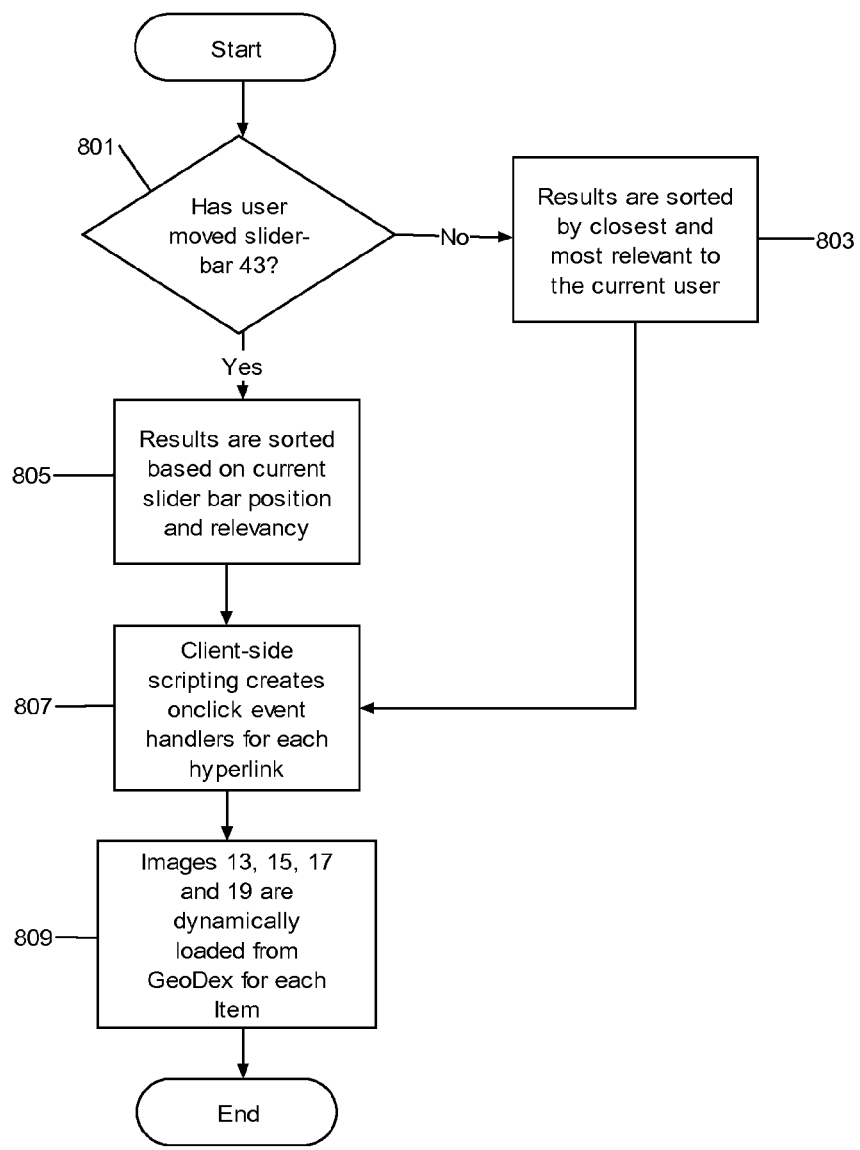
FIG. 12 is a flow chart that shows an embodiment of the process by which the software of the present invention assembles a web page for the user agent (e.g., web browser)

One embodiment of the method by which the software of the present invention assembles a web page for the user agent (see Step 603, FIG. 6) is described in further detail with respect to FIG. 12. More particularly, the software determines whether the user has moved slider-bar 43. If the user has not, the website listings (e.g., search results) are sorted by distance and relevancy to the user, step 803. To this end, the search results are sorted such that links visited by other people located closest to the user, and therefore the most relevant to the user, are listed towards the top of the web page. Results that were visited by other people located further away for the user, and are therefore less relevant to the user, are listed further down the page. If, on the other hand, the user has moved the slider-bar 43, the software sorts the search listings based on both the current position of the slider 43 on slide bar 41, as well as the relevancy of the listings to the user, Step 805. Under either scenario, the client-side scripting (e.g., on the browser) creates onClick event handlers for each hyperlink, step 807. The software then dynamically loads the images (e.g., boxes 13, 15, 17 and 19, slide bar 41, color gradient scale 51, and map 81) to the user's browser for each website listing, Step 809.

Figure 13:
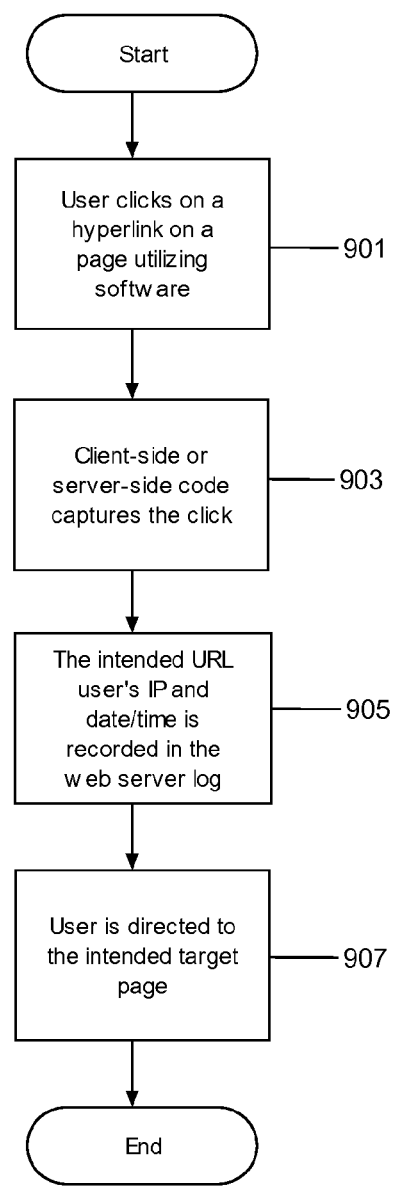
FIG. 13 is a flow chart that shows an embodiment of the process by which the software of the present invention captures a website hit by a user and directs the user to the target website.

The method by which the software of the present invention captures the hit and directs the user to the target (see Step 607, FIG. 6) is described further with respect to FIG. 13. More particularly, after the user clicks on a link on a web page utilizing the software of the present invention, Step 901, either the client-side or server-side code captures the click, Step 903. The intended URL, user's IP and date/time are then recorded in the web-server log, Step 905 in the manner discussed below. The user is then directed to the intended target web page, Step 907.

Retrieving Hit Statistics

Figure 4:
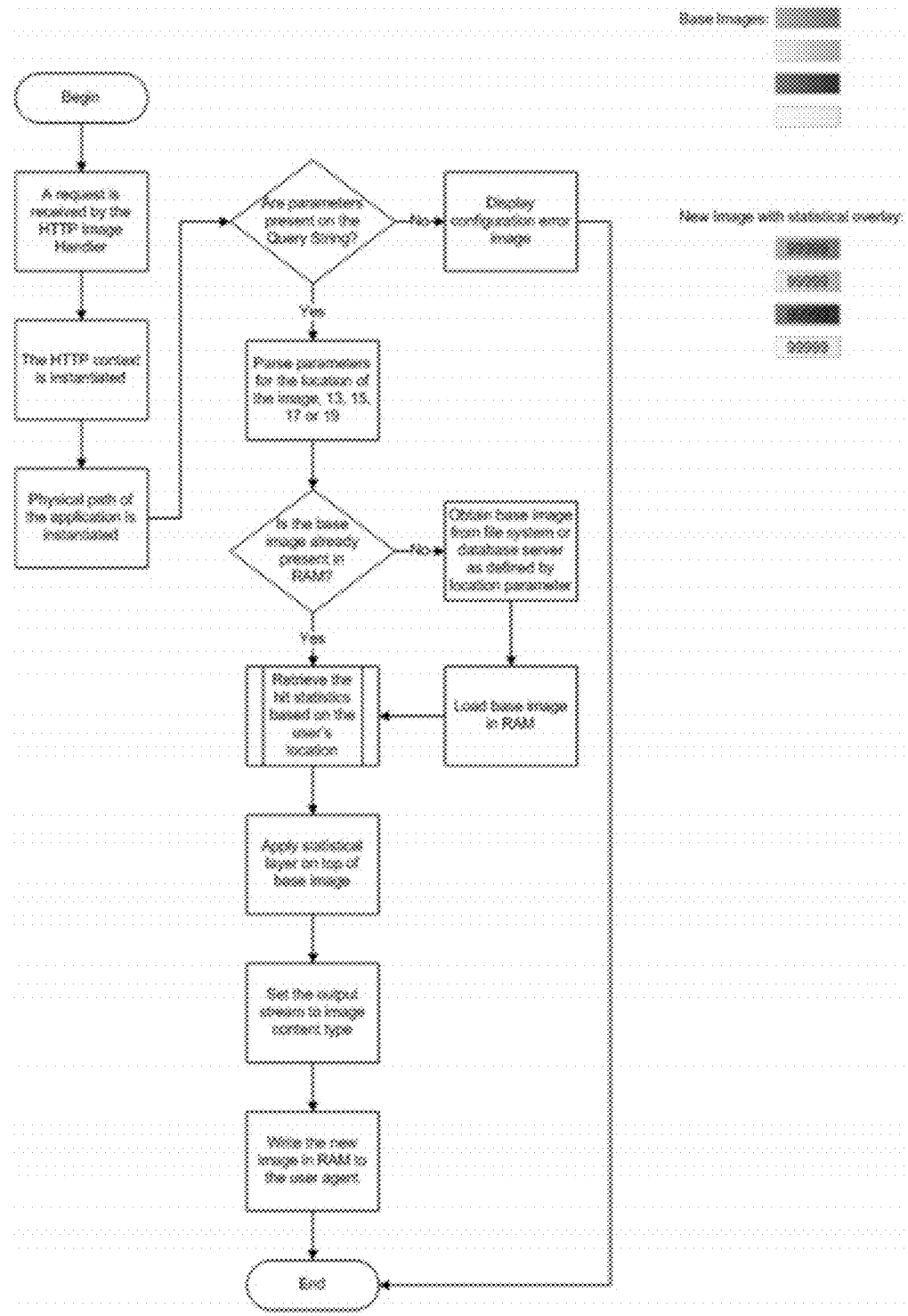
FIG. 4 is a flow chart which shows an embodiment of the process by which the software of the present invention processes requests for images containing the geographic data.
Figure 5:
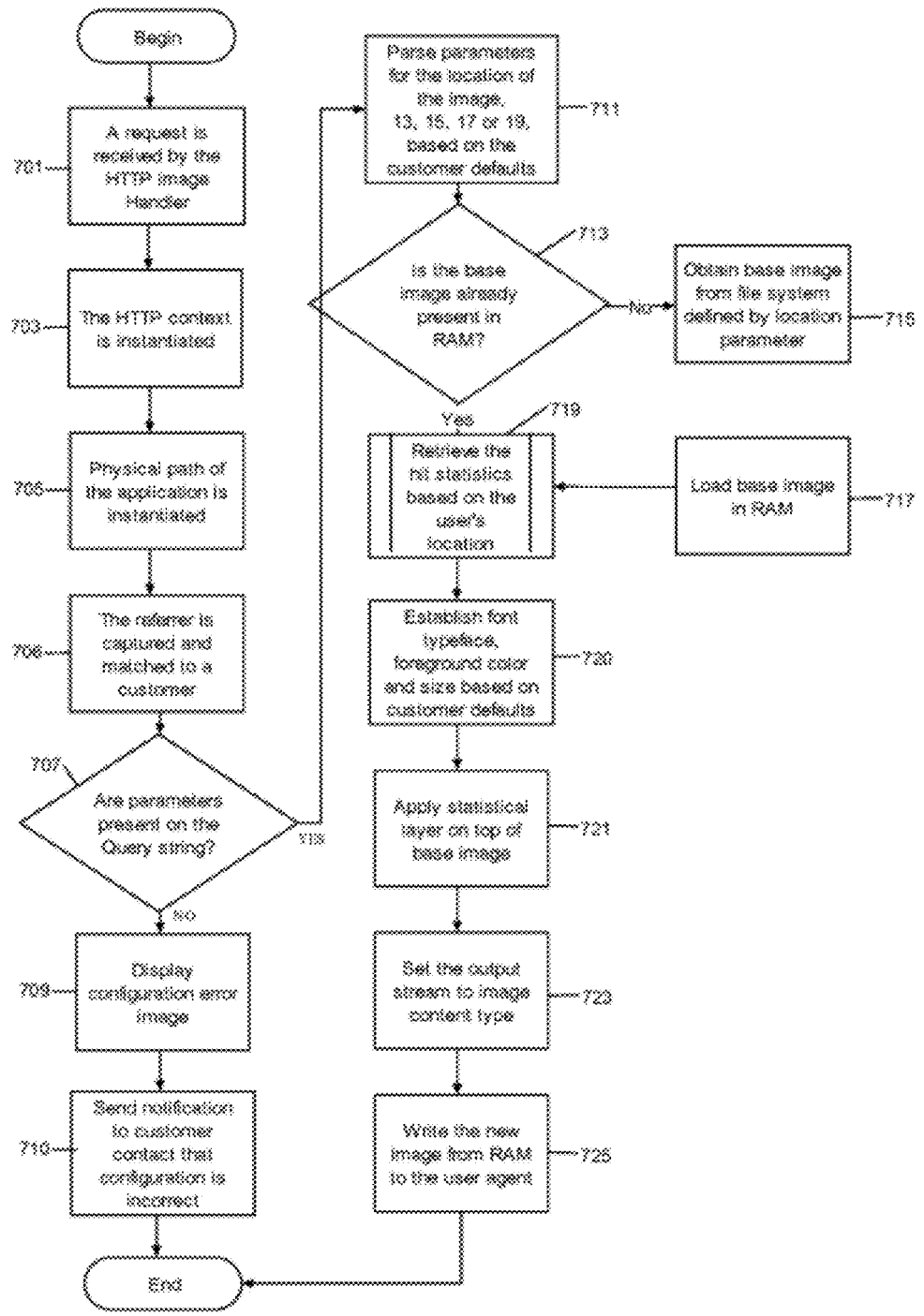
FIG. 5 is a flow chart which shows another embodiment of the process by which the software of the present invention processes requests for geographic data and images and generates custom images.
Figure 7:
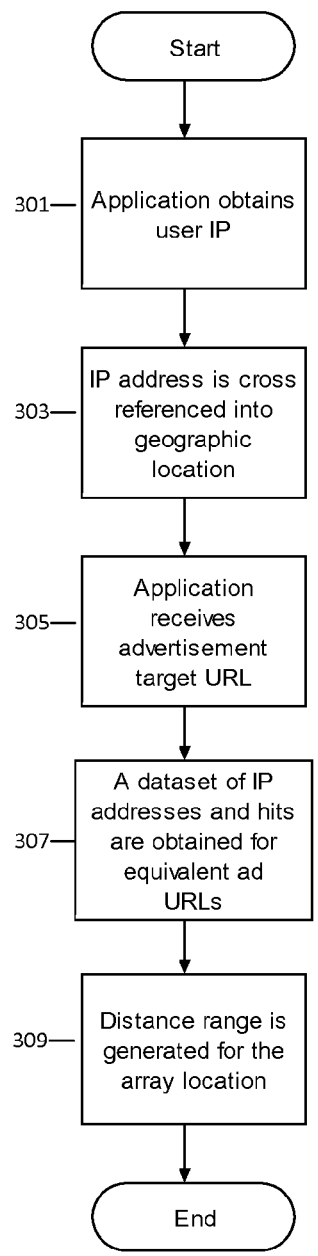
FIG. 7 is a flow chart showing an embodiment of the process by which the software of the present invention retrieves hit statistics stored in a database.

The process by which the software of the present invention retrieves the hit statistics in Step 219 of FIG. 4 and in Step 719 of FIG. 5, is now described with a reference to FIG. 7. At the start of this process, the software obtains the user's internet protocol ("IP") address, Step 301. As is known, certain of the octets (e.g., the first three octets) in an IP address can be used to identify the geographic location of the user's computer associated with the IP address. The system of the present invention implements a reference database in which the identification of geographic locations is stored in association with such octets or range of octets. There are known services, such as MaxMind GeoIP® City Database, which can be used for this purpose. Alternatively, such a database can be established by the software developer. The user's IP address obtained in step 303 is cross referenced to a specific geographic location identified in the database, Step 303.

When an Internet user enters a keyword search on a search engine or visits a parked/redirect web page, the software will receive an advertisement target URL (e.g., listings that are responsive to a keyword search on a search engine or redirect page or a request to visit the parked), Step 305. Next, the software obtains data from the "Hit" list (see FIG. 9) previously stored IP addresses of other Internet users who visited equivalent ad URLs, Step 307. For example, where an Internet user enters the same keyword search as other prior Internet users for which information has been previously stored, the software will obtain, from the database, all previously stored IP addresses of the prior Internet users who have clicked on each of the links in the listing of web addresses for the keyword search. In the case of a parked/redirect web page, the same process is implemented with respect to websites visited by other users from the parked/redirect pages.

Next, a distance range is generated for each of the IP addresses in the array of locations discussed above (e.g., local, statewide, regional, nationwide), Step 309. In this regard, in one embodiment, the software uses the latitudes and longitudes that are known to be associated with IP addresses to calculate the distance between the new user's IP address and the IP addresses of the other Internet users retrieved in Step 307. The formula used to calculate the distance is generally known as the "great-circle distance formula" or "orthodromic distance formula", which calculates the distance between two points on a sphere. For example, whereas here, the sphere is the planet Earth, the following formula is used to calculate distance:

```
USE [GeoDex]
GO
/****** Object: UserDefinedFunction [dbo].[DistanceBetween] Script Date:
07/06/2009 10:30:44 ******/
SET ANSI_NULLS ON
GO
SET QUOTED_IDENTIFIER ON
GO
ALTER FUNCTION [dbo].[DistanceBetween] (@Lat1 as real,
   @Long1 as real, @Lat2 as real, @Long2 as real)
RETURNS real
AS
BEGIN
DECLARE @dLat1InRad as float(53);
SET @dLat1InRad = @Lat1 * (PI( )/180.0);
DECLARE @dLong1InRad as float(53);
SET @dLong1InRad = @Long1 * (PI( )/180.0);
DECLARE @dLat2InRad as float(53);
SET @dLat2InRad = @Lat2 * (PI( )/180.0);
DECLARE @dLong2InRad as float(53);
SET @dLong2InRad = @Long2 * (PI( )/180.0);
DECLARE @dLongitude as float(53);
SET @dLongitude = @dLong2InRad - @dLong1InRad;
DECLARE @dLatitude as float(53);
SET @dLatitude = @dLat2InRad - @dLat1InRad;
/* Intermediate result a. */
DECLARE @a as float(53);
SET @a = SQUARE (SIN (@dLatitude / 2.0)) + COS (@dLat1InRad)
   * COS (@dLat2InRad)
   * SQUARE(SIN (@dLongitude / 2.0));
/* Intermediate result c (great circle distance in Radians). */
DECLARE @c as real;
SET @c = 2.0 * ATN2 (SQRT (@a), SQRT (1.0 - @a));
DECLARE @kEarthRadius as real;
/* SET @kEarthRadius = 6376.5;     kms */
SET @kEarthRadius = 3956.0;/* miles */
DECLARE @dDistance as real;
SET @dDistance = @kEarthRadius * @c;
return (@dDistance);
END
```

The foregoing formula is well known and can be retained from public sources.

Based on this calculation, each IP address of the prior users is classified as a being "local", "statewide", "regional", or "Nationwide" relative to the new user. Then, the total number of prior user's (i.e., previously stored IP addresses) is tallied for each such classification and populated in boxes 13, 15, 17, and 19. This process is performed with respect to each website listing that is relevant to the user's search terms or each website listings on the parked page.

Parsing of Log Files

Figure 8:
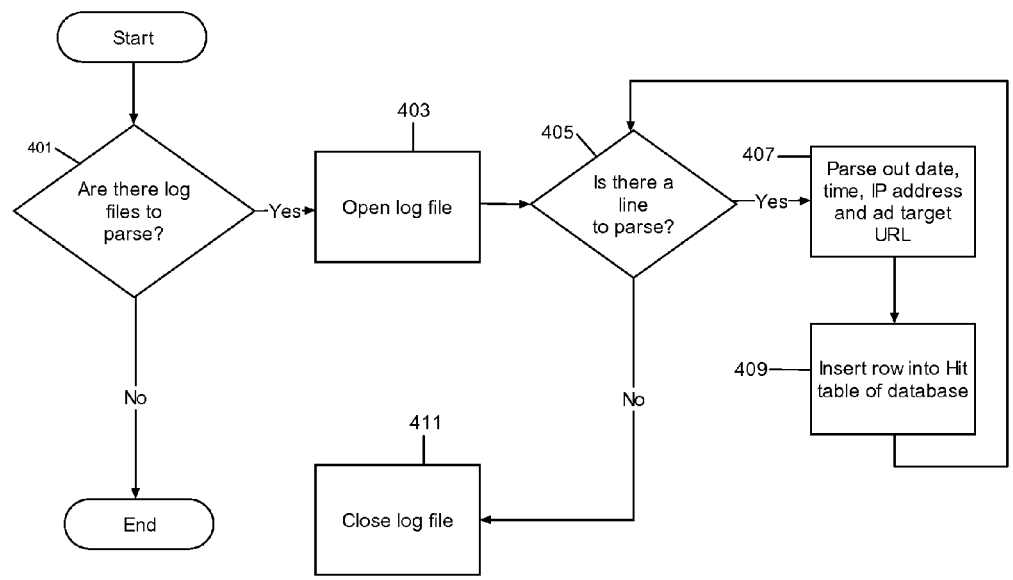
FIG. 8 is a flow chart that shows an embodiment of the process for parsing information captured in FIG. 6.

As requests are received by the HTTP Image Handler, the number of hits for a particular web page are recorded in a log. In one embodiment, and as shown in FIG. 8, these log files are parsed in a manner which enables the software of the present invention to utilize the information stored in its log files. As shown, the software determines whether there are log files to parse, Step 401. If not, the parsing process ends. If, on the other hand, there are such files to parse, then the software opens the log file, Step 403. Once opened, the software determines whether there are any lines stored in the log to be parsed, Step 405. If not, the log file is closed, Step 411, and the parsing process is terminated. If, on the other hand, there are text lines to parse, the software parses out the date, time, IP address of the user, and ad target URL that was visited by the user. Next, the parsed information is inserted into a row in the hit table of the database (see FIG. 8). Steps 405-409 are repeated until there are no more lines in the log file to parse. At that time, the log file is closed, Step 411, and the parsing process ends.

The Hit Table

As discussed above, each time an Internet user clicks on a website link provided either in response to a keyword search on a search engine or on a parked/redirect web page, the software of the present invention stores information in a log file concerning the Internet user and the website visited by the user. Such information includes the user's IP address, the URL of the website visited by the user, the pages on that URL that were visited, and the date that the user visited the URL. As also discussed above, the software parses each line of information in the log file (see steps 405-407, FIG. 8). This parsed information is stored (see step 409, FIG. 8) on the database in the Hit table of FIG. 9. In one embodiment, in order to reduce storage costs, the user's IP address is converted into Four TINYINTs or as a single integer. Methods for converting IP addresses to and from these formats are well known.

It should be understood that the user's IP address according to other standards (e.g., IPv6) may processed by the software of the present invention.

Figure 9:
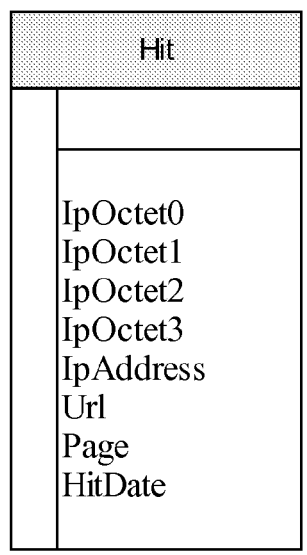
FIG. 9 is one embodiment of a table in which the information parsed in FIG. 8 is stored.

Referring to FIG. 9, the parsed information is stored in the Hit Table. In this embodiment, the user's IP address has been converted into Four TINYINTs (e.g., "IPOctet0", "IPOctet1", "IPOctet2", "IPOctet3") with a possible range from zero to two-hundred fifty-five. Each of the TINYINTs are stored in four separate fields. The Hit Table also stores the IP address ("IPAdress") of the user, the web address ("URL") of the website visited by the user, subpages ("Page") within the URL visited by the user, and the date and time ("HitDate") that the user visited those pages. To facilitate faster response times, the IP address is encoded into a complex integer to allow better indexing and data positioning.

Relational Database for Customer Information

As noted above, the software of the present invention can be implemented in conjunction with search engines, parked web pages, ISP redirect pages, and other similar web listing services. These web services or their advertisers may be required to pay a fee to the developer of the software of the present invention for the use of the software. As such, these web services are referred to herein as "customers". As discussed below, identifying information concerning the customer and its account is stored in a relational database. In one embodiment, this information includes the data discussed with respect to the entity relationship diagram of FIG. 10.

More particularly, for each customer, the relational database includes a "Customer" table 501 with a "CustomerID" field for storing an identification number associated with that customer, as well as a "Name" field for storing the full name of the customer. The CustomerID field is the primary key of table 501. This information enables the software to identify the customer when receiving a request from the HTTP Handler regarding the content on the customer's web page. In one embodiment, the customer image may be the customer's logo, stored in the "Logo" field, and the customer may specify the precise location of where its logo will appear on the website listings that are displayed in FIGS. 2 and 3. In specifying the geographic locations of users who have clicked on links, various units of distance measurements (e.g., miles, kilometers, etc.) can be used to specify how far the users are from one another. Thus, the customer may specify any unit of measure for specifying this distance in the "Measure" field of Table 501.

The relational database also includes a "Domain" table 503 with a "URL" field for identifying the URL (website address to include the protocol and hostname (including the domain name)) of each customer, as well as a CustomerID field for storing the identification number of each customer. The "URL" field is the primary key "PK", and the CustomerID field is the foreign key "FK1" for associating the information in the Domain table for a particular customer with the information in the Customer table for that particular customer.

The relational database also includes a "Page" table 505 with a "Page" field for storing the remaining portion of the URL (directory (or directories) and file name) of each of the pages on that website and a "URL" field for storing the domain name of the customer's website. The Page field is the primary key for table 505, and the URL field is the foreign key pointing to primary key (i.e., URL field) in table 503.

The relational database also includes a "CustomArray" table 507 which includes a "Page Position" field for identifying the location of a custom image, (see, e.g., FIG. 2, boxes 13, 15, 17 or 19), that the customer would like to have appear on the pages identified in the Page field of table 505. The Custom Array table 507 also includes "CustomImageId", "DistanceStart", "DistanceEnd" and "Description" fields. The CustomImageId field includes an identification number for the custom image (e.g., a custom graphic to replace boxes 13, 15, 17 and 19), and the Description field includes a description of the custom image. As noted above, as an alternative to using the local, statewide, regional, and nationwide measures discussed herein, some customers may wish to designate the geographic locations of other users who have clicked on a link according to a radius band or some other measure of distance. Thus, for example, the Description field stores such radius band or other measure of distance (when specified by the customer) to replace the default local, statewide, regional, and national designations. Moreover, units of distance between the current Internet user and other prior users are stored in the DistanceStart and DistanceEnd fields.

Additionally, the relational database also includes a "Custom Image" table 509, which includes a "Custom ImageId" field (here, the primary key "PK"), a "CustomerId" field (here, the foreign key "FK1" that points to Table 501), an "Image" field, and a "Description" field. In one embodiment, the custom image is stored in the "Image" field of Table 509. The description field in table 509 refers to the name given to a custom image that the customer has specified to be used in place of boxes 13, 15, 17 and 19. The Customer Image Field includes the same information that is stored in the same entitled field of Table 507. Likewise, the CustomerId includes the same information that is stored in the same entitled field of Table 501. The "CustomerID" field is stored in the Custom-Image table 509 in addition to Customer tale 501 since the user may want to reuse images on more than one domain, page, etc.

The relational database may also include an "Image Type" table 511. In one embodiment, Table 511 includes an "Image TypeId" field for storing a unique identification number for the various type of base images (e.g., colored boxes 13, 15, 17, and 19, color gradient bar 51, and slide bar 41) used in the present invention, as well as a "Description" field for storing a natural language description of these image types. Here, the ImageType ID field is the primary key "PK".

The relational database also includes an "Image" table 513 which includes an "ImageId" field and "ImageType" field for storing the identification numbers and related images used by web pages that implement the software of the present invention. Additionally, an "Image" field is provided in table 513 for storing each of the base images used by the software of the present invention. Here, the "ImageId" field is the primary key "PK" and the "ImageTypeId" field is the foreign key "FK1" that points to the primary key in Table 511.

System Architecture and Hardware

It should be understood that the foregoing software and method of the present invention can be implemented on one or more computers having one or more processors, operating system, memory, and communication device. Moreover, the software and method of the present invention may be deployed on a server across an open or closed network, including, for example, the Internet, a wide area network, a local area network, intranet, etc. The term "software" as used herein may refer to computer readable media including computer processor-readable code that, when read by a processor, causes the processor to performs the various steps of the exemplary embodiments of the methods described herein. It should be appreciated that the various exemplary embodiments of the present invention may also be implemented using a combination of software and hardware, or only hardware devices.

The software of the present invention can be configured to have some or all of the features described herein as default settings. However, the entity (e.g., web developer, customer, etc.) utilizing the software will be provided with a variety of options to change the default settings to his or her preferences. The software may also be provided to such entities on a subscription basis, wherein such entities can self-subscribe the software. In setting up an account to use the software, the entity will be guided through a series of screens (not shown) which prompt the entity to select and/or change the default settings. For example, the entity will be prompted to indicate whether it would like to use certain specific features of the software, including, for example, whether or not images should be displayed. For example, the user can specify whether it would like each of boxes 13, 15, 17, and 19, color gradient scale 51, slide bar 41 and slider 43, and map 81 to be displayed to Internet users. The entity may also specify that no images are to be displayed. Additionally, the entity can specify the location of these images. Moreover, the entity can specify whether any geographic labels should be used in conjunction with these labels. The entity can also specify any other images (e.g., custom images) that it would like to use. As such, it should be understood that any combination of the features described herein can be used, and such features are not all required to obtain the benefits of the present invention.

Additional Embodiments

It should also be noted that the software and computer-implemented method of the present invention is not limited to the exemplary uses described herein. In this regard, the software and computer-implemented method of the present invention can have a variety of uses, including, but not limited to: search engines; parked domains; multiple domains; ISP redirect pages; invalid URL traffic for an ISP; invalid page/directory traffic for a website hosting account; invalid page/ directory traffic for a website host (reseller server); free wi-fi starting pages (e.g., airport pages, lobby pages, etc.) showing local weather, hotels, cabs, etc.; hotel/conference centers' courtesy computer or in-room Ethernet with local search pages for visitors; "Sidebar" on a website (e.g., nested advertisements on websites that cater to varied audiences); a "widget" for Windows sidebar; and a toolbar for the web browser that keeps changing based on the location of the computer that incorporates the software of the present invention and current location and most popular search for that area for the day. The software and computer implemented method of the present invention also be implemented as an application for "mobile" smart phones (e.g., Blackberry) that determines geographic locations using GPS.

In another embodiment, a user of the software (e.g., web developer, software developer, website owner, etc.) can insert code into a web page generated by the software of the present invention. This code allows the website to have a search box that displays a search results page that can be customized to include some or all of the features of the software describe herein. For example, the code can allow the user of the software to modify the look of the search results page. In this regard, a company logo or statistics icons may be added with the search results. The software user can apply this code to as many other domains/websites as he or she so chooses.

In another embodiment, the user of the software may insert advertising code on his or her web page that is generated by the software of the present invention. In this regard, the advertising code would cause the display of advertisements based on, for example, one or more of the following: the content of the web page; the URL and page name (e.g., for the URL carports.com/metal.html, the advertising code would retrieve ads that have carports and/or metal); and a list of categories (e.g., Auto, Garden, Home, Computer, Internet, etc) from which the user can select. Where a list of categories is used, such list could be obtained from advertisers that use the software of the present invention. Additionally, ad-codes can be created based on the software user's preferences for different web pages and website themes.

In yet another embodiment, the software of the present may integrate on-line forums so that a postbit could be targeted towards specific visitors (e.g., A vbulletin mod). Additionally, a custom web page can be provided for users of the software to point to, and which allows such users to customize that page. For example, the software may be implemented at Internet Cafe's, Gaming lounges, and 404 pages as a "start" page.

In another embodiment, the user of the software can create a custom search page that is hosted by other websites that use the software. The user can also obtain and use (e.g., by copying and pasting) the code discussed herein from such other websites. In this way, the user can either re-direct their traffic to the other website or use their own website hosting that obtains information from the servers of the software developer of the present invention.

In another embodiment, the user of the software can create a regular search that tells visitors what other people in their areas have searched for over a given time period (e.g., day, week, prior weeks, month, year, etc.)

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims and not by the foregoing specification.

What is claimed is:

1. A computer-implemented method comprising:
 (a) accessing, using one or more processors, data from visitor computers related to corresponding visitors who have visited one or more websites;
 (b) determining, using one or more processors, visitor geographic areas corresponding to locations of the visitors;
 (c) receiving from a requestor's computer, using one or more processors, one or more signals indicating a first request to provide at least a portion of data to be provided on a webpage, the at least a portion of data related to the one or more websites;
 (d) determining, using one or more processors, a request geographic area from where the request originates;
 (e) generating, using one or more processors, a subset of the data that pertains to the requested data based on:
  i. relevancy of the requested data to the request geographic area, and
  ii. relevancy of the requested data to the visitor geographic areas located inside and outside the request geographic area; and
 (f) providing, using one or more processors, the subset of the data;
 (g) providing to the requestor's computer, using one or more processors, data that indicates whether or not the visitors found each item in the subset to be relevant to the visitor geographic areas located inside and outside the request geographic area;
 (h) providing to the requestor's computer, using one or more processors, an interface for viewing the data that indicates whether or not the visitors found each item in the subset to be relevant to the visitor geographic areas located inside and outside the request geographic area, the interface comprising graphics indicating a number of times visitors have visited the one or more websites.

2. The computer-implemented method of claim 1 wherein the visitor geographic areas located in and outside the request geographic area comprise at least one of:
 (a) a geographic region local to the geographic area from where the request originates;
 (b) a geographic region within a state of the geographic area from where the request originates;
 (c) a geographic region within a region of the geographic area from where the request originates;
 (d) a geographic region within a nation of the geographic area from where the request originates;
 (e) a geographic region within a city of the geographic area from where the request originates;
 (f) a geographic region within a specified distance from the geographic area from where the request originates; or
 (g) a geographic region near the geographic area from where the request originates.

3. The method of claim 1, wherein the graphics comprise one or more boxes, each of the one or more boxes corresponding to a respective one of the one or more websites and including a number that indicates the number of times visitors have visited the respective one of the one or more websites.

4. The computer-implemented method of claim 3 wherein the bar indicates, by use of one or more colors, the relevance of each set in the subset of data to the respective geographic areas.

5. The method of claim 1, wherein the interface allows for reorganization of the subset according to each of the one or more visitor geographic areas located inside and outside the request geographic area, the interface comprising a bar indicating the relevance of each set in the subset of data to the respective visitor geographic areas.

6. A computer-implemented method comprising:
(a) accessing, using one or more processors, data from visitor computers related to corresponding visitors who have visited one or more websites;
(b) determining, using one or more processors, visitor geographic areas corresponding to locations of the visitors;
(c) receiving from a requestor's computer, using one or more processors, one or more signals indicating a first request to provide at least a portion of data to be provided on a webpage, the at least a portion of data related to the one or more websites;
(d) determining, using one or more processors, a request geographic area from where the request originates;
(e) generating, using one or more processors, a subset of the data that pertains to the requested data based on:
 i. relevancy of the requested data to the request geographic area, and
 ii. relevancy of the requested data to the visitor geographic areas located inside and outside the request geographic area;
(f) providing to the requestor's computer, using one or more processors, the subset of the data, wherein:
 i. the subset is organized with each item of data associated with one of the visitor geographic areas located inside and outside the request geographic area,
 ii. items of data in the subset that are most relevant to the request geographic area are associated with a first visitor geographic area; and
 iii. items of data in the subset that are less relevant to the geographic area from where the request originates are associated with a second visitor geographic area; and
(g) providing to the requestor's computer, using one or more processors, an interface for viewing the data that indicates whether or not the visitors found each item in the subset to be relevant to the visitor geographic areas located inside and outside the request geographic area, the interface comprising graphics indicating a number of times visitors have visited the one or more websites.

7. The computer-implemented method of claim 6, further comprising steps of:
receiving from the requestor's computer, using one or more processors, one or more signals indicating a second request to provide at least a second portion of the data, wherein the second request originates from a second request geographic area different from the request geographic area;
(b) determining, using one or more processors, the location of the second request geographic area; and
(c) generating, using one or more processors, a second subset of the data responsive to the second request based on:
 i. relevancy of the requested data to the second request geographic area, and
 ii. relevancy of the requested data to the visitors inside and outside the second geographic area.

8. The computer-implemented method of claim 6 wherein the visitor geographic areas located inside and outside the request geographic area comprises at least one of:
(a) a geographic region local to the geographic area from where the request originates;
(b) a geographic region within a state of the geographic area from where the request originates;
(c) a geographic region within a region of the geographic area from where the request originates;
(d) a geographic region within a nation of the geographic area from where the request originates;
(e) a geographic region within a city of the geographic area from where the request originates;
(f) a geographic region within a specified distance from the geographic area from where the request originates; or
(g) a geographic region near the geographic area from where the request originates.

9. The computer-implemented method of claim 6 wherein the interface further comprises at least one of the following:
(a) graphics containing text relating to a number of times visitors have visited each of the one or more websites; or
(b) geographic data pertaining to the visitors.

10. The computer-implemented method of claim 6 wherein the interface further comprises at least one of the following:
(c)
(a) a map indicating geographic information pertaining to the visitors; or
(b) a map automatically indicating, via colored markers, a unit of distance between at least one of relevant geographic information pertaining to the visitors and the geographic area from where the request originates.

11. The method of claim 6, wherein the graphics comprise one or more boxes, each of the one or more boxes corresponding to a respective one of the one or more websites and including a number that indicates the number of times visitors have visited the respective one of the one or more websites.

12. The method of claim 6, wherein the interface allows for reorganization of the subset according to each of the one or more visitor geographic areas located inside and outside the request geographic area, the interface comprising a bar indicating the relevance of each set in the subset of data to the respective visitor geographic areas.

13. The computer-implemented method of claim 12 wherein the bar indicates, by use of one or more colors, the relevance of each set in the subset of data to the respective geographic regions.

14. A system comprising one or more processors and computer readable media including computer processor-readable code that is read by the one or more computer processors so that the one or more computer processors perform a method comprising the following steps:
(a) accessing data from visitor computers related to corresponding visitors who have visited one or more websites;
(b) determining visitor geographic areas corresponding to locations of the visitors;
(c) receiving from a requestor's computer one or more signals indicating a first request to provide at least a portion of data to be provided on a webpage, the at least a portion of data related to the one or more websites;
(d) determining a request geographic area from where the request originates;
(e) generating a subset of the data that pertains to the data requested based on:
 i. relevancy of the requested data to the request geographic area; and
 ii. relevancy of the requested data to the visitor geographic areas located inside and outside the request geographic area; and
(f) providing the subset of the data;
(g) providing to the requestor's computer data that indicates whether or not the visitors found each item in the subset to be relevant to the visitor geographic areas located inside and outside the request geographic area;
(h) providing to the requestor's computer an interface for reorganizing the subset according to each of the one or more visitor geographic areas located inside and outside the request geographic area, the interface comprising a bar indicating the relevance of each set in the subset of data to the respective visitor geographic areas and graphics indicating a number of times visitors have visited the one or more websites, the graphics comprising one or more boxes, each of the one or more boxes corresponding to a respective one of the one or more websites and including a number that indicates the number of times visitors have visited the respective one of the one or more websites.

15. The system of claim 14 wherein the interface for reorganizing the subset reorganizes the subset in response to a command.

16. The system of claim 14 wherein the visitor geographic areas located inside and outside the request geographic area comprises at least one of:
    (a) a geographic region local to a city in the geographic area from where the request originates;
    (b) a geographic region within a state of the geographic area from where the request originates; or
    (c) a geographic region within a region of the geographic area from where the request originates.

17. The system of claim 14 wherein the interface comprises at least one of the following:
    (a) a map;
    (b) text;
    (c) images;
    (d) hyperlinks;
    (e) graphical data;
    (f) videos;
    (g) charts; or
    (h) forms.

18. The system of claim 17 further comprising updating the map to reflect reorganization of the subset.

19. The system of claim 14 further comprising manually inputting a geographic area different from the request geographic area.

20. The system of claim 19 wherein the interface for reorganizing the subset reorganizes in response to the manual input of the geographic area different form the request geographic area.

* * * * *